(12) United States Patent
Wang et al.

(10) Patent No.: US 11,987,337 B2
(45) Date of Patent: May 21, 2024

(54) MARINE DIESEL POWER SYSTEM

(71) Applicant: Wuhan Second Ship Design and Research Institute, Wuhan (CN)

(72) Inventors: Wei Wang, Wuhan (CN); Yuansheng Lin, Wuhan (CN); Zhiqiang Qiu, Wuhan (CN); Zhenxing Zhao, Wuhan (CN); Xingsheng Lao, Wuhan (CN); Hanbing Ke, Wuhan (CN); Bangming Li, Wuhan (CN); Zhiguo Wei, Wuhan (CN); Kelong Zhang, Wuhan (CN); Kai Chen, Wuhan (CN); Yongquan Li, Wuhan (CN)

(73) Assignee: Wuhan Second Ship Design and Research Institute, Wuhan (CN)

( * ) Notice: Subject to any disclaimer, the term of this patent is extended or adjusted under 35 U.S.C. 154(b) by 407 days.

(21) Appl. No.: 17/358,475

(22) Filed: Jun. 25, 2021

(65) Prior Publication Data

US 2022/0126969 A1    Apr. 28, 2022

Related U.S. Application Data

(63) Continuation of application No. PCT/CN2021/073232, filed on Jan. 22, 2021.

(30) Foreign Application Priority Data

Oct. 28, 2020   (CN) .......................... 202011174605.4

(51) Int. Cl.
    *B63H 21/38*        (2006.01)
(52) U.S. Cl.
    CPC .................. *B63H 21/383* (2013.01)

(58) Field of Classification Search
    CPC ...... F01N 3/0205; F01N 3/043; F01N 13/004; B63H 21/383; F28D 1/022; F28D 1/047; F28F 9/0221; F28F 9/0219
    See application file for complete search history.

(56) References Cited

U.S. PATENT DOCUMENTS

| | | | | |
|---|---|---|---|---|
| 2,990,797 A | * | 7/1961 | Moeller | .................. F28D 1/022 |
| | | | | 165/44 |
| 5,004,042 A | * | 4/1991 | McMorries, IV | ........ F28F 9/06 |
| | | | | 165/41 |

FOREIGN PATENT DOCUMENTS

| | | | |
|---|---|---|---|
| CN | 202719899 U | * | 2/2013 |
| JP | 61105286 | * | 5/1986 |

(Continued)

*Primary Examiner* — Frantz F Jules
*Assistant Examiner* — Martha Tadesse
(74) *Attorney, Agent, or Firm* — Piloff Passino & Cosenza LLP; Rachel K. Piloff; Sean A. Passino

(57) ABSTRACT

The embodiment of the invention provides a marine diesel power system comprising a diesel engine, a conformal heat exchanger with a first inlet and a first outlet thereof connected to the diesel engine and upper and lower sealing heads thereof as well as a second inlet and a second outlet for inflowing and discharging seawater, and a jet device at a second outlet of the conformal heat exchanger, wherein a first inlet, a second inlet and an outlet of the jet device are separately used for sucking seawater discharged from the second outlet, connecting to a diesel engine exhaust tube and discharging seawater and waste gas discharged from the diesel engine exhaust tube. By arranging the jet device at the second outlet, the heat exchange form of the conformal heat exchanger is changed into forced convection heat exchange, so that the heat exchange efficiency of the conformal heat exchanger is improved.

10 Claims, 3 Drawing Sheets

(56) References Cited

FOREIGN PATENT DOCUMENTS

| | | | |
|---|---|---|---|
| JP | S61105286 | * | 5/1986 |
| KR | 20120002540 | * | 2/2012 |
| KR | 2012-0002540 | * | 4/2012 |

* cited by examiner

MARINE DIESEL POWER SYSTEM

CROSS REFERENCE TO RELATED APPLICATION

The invention relates to the technical field of marine outboard cooling, in particular to a marine diesel power system.

BACKGROUND OF THE INVENTION

At present, a marine outboard cooler is generally arranged at a sea chest. The outboard seawater enters a cooler box through a bottom grid, and then exchanges heat with a heat medium in the outboard cooler. After the heat exchange, the seawater is heated, and then escapes by ascending to a grid at a high portion of the cooler as a result of its reduced density. The heat exchange between the existing outboard cooler and the seawater is natural convection with lower heat exchange efficiency; and moreover, there is only one grid between the seawater and the outboard cooler, which is easily blocked by pollutants and result in drop in heat exchanging ability, thereby causing an overheating accident from cooled equipment in a cabin.

SUMMARY OF THE INVENTION

The embodiment of the invention provides a marine diesel power system for addressing the defect that an outboard cooler in the prior art is low in heat exchange efficiency.

The embodiment of the invention provides a marine diesel power system, including a diesel engine, a conformal heat exchanger with a first inlet and a first outlet thereof connected to the diesel engine and upper and lower sealing heads thereof as well as a second inlet and a second outlet for inflowing and discharging seawater, and a jet device at a second outlet of the conformal heat exchanger, where a first inlet, a second inlet and an outlet of the jet device are separately used for sucking seawater discharged from the second outlet, connecting to a diesel engine exhaust tube and discharging seawater and waste gas discharged from the diesel engine exhaust tube.

According to the marine diesel power system provided by one embodiment of the invention, the conformal heat exchanger includes an inner shell plate which is a hull, an outer shell plate, the shape of which is matched with that of the inner shell plate, a heat exchange tube as well as an upper sealing head and a lower sealing head, where the outer shell plate is connected to the inner shell plate to define the housing of the conformal heat exchanger; the shape of the heat exchange tube, which is arranged in the housing, is matched with the inner shell plate; and both the upper and lower sealing heads are arranged in the housing, and are separately positioned at the two sides of the heat exchange tube.

According to the marine diesel power system provided by one embodiment of the invention, a first inlet and a second inlet of the conformal heat exchanger are separately formed in the inner shell plate, and a second inlet and a second outlet of the conformal heat exchanger are separately formed in the outer shell plate.

According to the marine diesel power system provided by one embodiment of the invention, the conformal heat exchanger further includes an inlet grid which is arranged at the second inlet thereof, and defines an included angle with the outer shell plate, and an outer grid which is arranged at the second outlet thereof, and defines an included angle with the outer shell plate.

According to the marine diesel power system provided by one embodiment of the invention, the conformal heat exchanger further includes a plurality of baffle plates which are arranged in the housing and define included angles with the heat exchange tube.

According to the marine diesel power system provided by one embodiment of the invention, the jet device includes a diffusing hole and a spray nozzle arranged in the diffusing hole, where a gap, configured to be a first inlet of the jet device, is formed between the outer wall of the spray nozzle and the inner wall of the diffusing hole.

According to the marine diesel power system provided by one embodiment of the invention, the spray nozzle is connected to the diesel engine exhaust tube and is configured to be a second inlet of the jet device.

According to the marine diesel power system provided by one embodiment of the invention, the diffusing hole includes a first portion, a second portion and a third portion which are sequentially connected, where a reducing structure is formed between two opposite end surfaces of the first portion, the two opposite end surfaces of the second portion are arranged at an equal distance, and a diverging structure is formed between the two opposite end surfaces of the third portion.

According to the marine diesel power system provided by one embodiment of the invention, the spray nozzle is arranged in the first portion and the second portion of the diffusing hole, and the third portion of the diffusing hole is configured to be an outlet of the jet device.

According to the marine diesel power system provided by one embodiment of the invention, a seawater grid is arranged at the hull outer shell plate and is located at the downstream of the diffusing hole; and a water inlet baffle plate is arranged between the outer shell plate and the hull outer shell plate, and is located at the downstream of the second inlet of the conformal heat exchanger.

According to the marine diesel power system provided by one embodiment of the invention, the jet device, which takes waste gas as its working fluid and takes heated seawater as absorbed fluid, is arranged at the second outlet of the conformal heat exchanger; under the action of turbulent diffusion, the heat exchange form of the conformal heat exchanger is changed into forced convection heat exchange, so that a flow rate of outboard seawater is increased, thereby improving the heat exchange efficiency of the conformal heat exchanger. At the same time, outboard seawater flows in a shell of the conformal heat exchanger; and for an underwater ship, the housing of the conformal heat exchanger does not need to be designed into a pressure-resistance structure, thereby facilitating improvement in safety reliability of the conformal heat exchanger.

BRIEF DESCRIPTION OF THE FIGURES

In order to better explain the embodiments of the invention or the technical solutions in the prior art, the drawings to be used in the description of the embodiments or the prior art will be briefly introduced as follows. Obviously, the drawings in the following description are some of the embodiments of the invention, those of ordinary skill in the art can obtain other drawings based on these drawings without creative work.

REFERENCE NUMERALS

1. Conformal heat exchanger; 2. Inner shell plate; 3. Heat exchange tube; 4. Outer shell plate; 5. Upper sealing head; 6. Lower sealing head; 7. First inlet; 8. First outlet; 9. Second inlet; 10. Second outlet; 11. Baffle plate; 12. Jet device; 13. First inlet of jet device; 14. Spray nozzle; 15. Diffusing hole; 16. Inlet grid; 17. Outlet grid; 20. Diesel engine; 21. Diesel engine exhaust tube; 22. Hull outer shell plate; 23. Water inlet baffle plate; 25. Seawater grid; 26. Diesel engine exhaust cooler; 26. Diesel engine waste gas regulating valve; 151. First portion; 152. Second portion; and 153. Third portion.

DETAILED DESCRIPTION OF THE PREFERRED EMBODIMENTS

In order to clarify the objectives, technical solutions, and advantages of the embodiments of the invention, the technical solutions in the embodiments of the invention will be clearly and completely described in conjunction with the accompanying drawings in the embodiments of the invention. Obviously, the described embodiments are part of the invention's embodiments, but not all of them. Based on the embodiments of the invention, all other embodiments obtained by those of ordinary skill in the art without creative work shall fall into the protection scope of the invention.

The following describes the marine diesel power system of the embodiments of the invention in conjunction with FIGS. 1 to 5.

Figure 1:
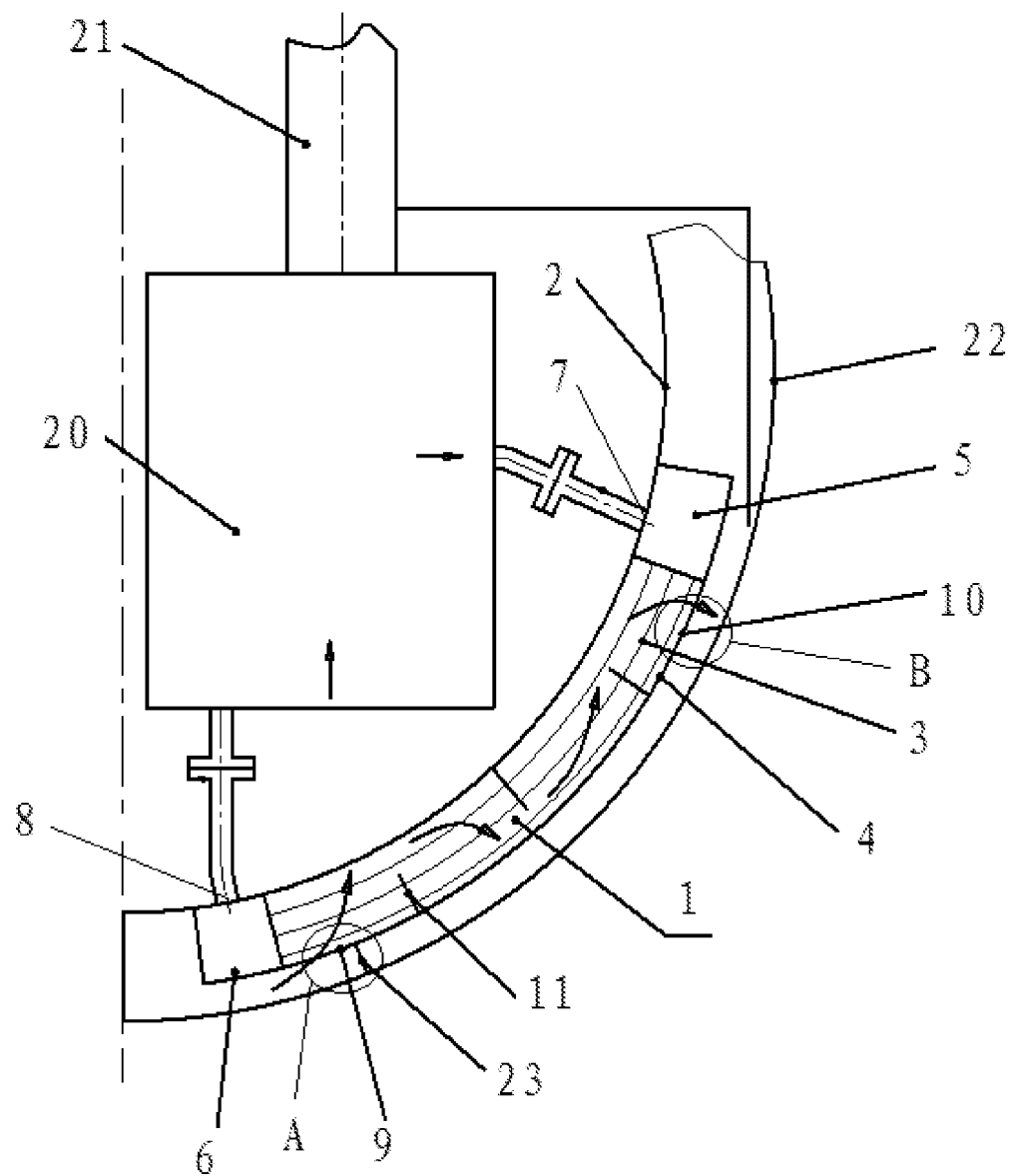
FIG. 1 is a schematic structural diagram of a marine diesel power system provided by one embodiment of the invention.

As shown in FIG. 1, in one embodiment of the invention, the marine diesel power system includes a conformal heat exchanger 1, a jet device 12 and a diesel engine 20, where the conformal heat exchanger 1 is connected to the diesel engine 20, a first inlet 7 of the conformal heat exchanger 1 is connected to the diesel engine 20, specifically, the first inlet 7 of the conformal heat exchanger 1 is connected to an upper sealing head 5 of the conformal heat exchanger 1 for introducing cooling water in the diesel engine 20 into a shell of the conformal heat exchanger 1; a first outlet 8 of the conformal heat exchanger 1 is connected to the diesel engine 20, specifically, the first outlet 8 of the conformal heat exchanger 1 is connected to a lower sealing head 6 of the conformal heat exchanger 1 for reflowing cooling water in the shell into the diesel engine 20. A second inlet 9 of the conformal heat exchanger 1 is used for flowing of seawater into the shell of the conformal heat exchanger 1, and a second outlet 10 of the conformal heat exchanger 1 is used for discharging heat-exchanged seawater.

Specifically, the cooling water of the diesel engine 20 enters the shell from the first inlet 7 of the conformal heat exchanger 1 through the upper sealing head 5 of the conformal heat exchanger 1, and seawater enters the shell from the second inlet 9 of the conformal heat exchanger 1; cooling water exchanges heat with seawater, and the cooled cooling water flows through the lower sealing head 6 of the conformal heat exchanger 1 and then flows into the diesel engine 20 from the first outlet 8 of the conformal heat exchanger 1 for cooling the diesel engine; and the heated seawater is discharged from the second inlet 10 of the conformal heat exchanger 1.

The jet device 12 is arranged at the second outlet 10 of the conformal heat exchanger 1, and heated seawater discharged from the second outlet 10 of the conformal heat exchanger 1 is sucked in a first inlet 13 of the jet device; a second inlet of the jet device 12 is connected to the diesel engine exhaust tube 21, and waste gas discharged from the diesel engine exhaust tube 21 also enters the jet device 12. Under the action of turbulent diffusion, the heated seawater and waste gas discharged from the diesel engine exhaust tube 21 are discharged from the outlet of the jet device 12 after being mixed.

At the same time, the diesel engine exhaust tube 21 is connected to a diesel engine exhaust cooler 25, and a diesel engine waste gas regulating valve 26 is connected on the diesel engine exhaust tube 21. Diesel engine waste gas discharged from the diesel engine exhaust tube 21 is at about 400° C., and will heat seawater around after entering the jet device; seawater in direct contact with the diesel engine waste gas at a high temperature is heated to flow upwards in an accelerating mode as a result of its increased temperature and reduced density, thereby increasing the flow rate at a seawater outlet and improving heat exchange ability of the conformal heat exchanger 1.

According to the marine diesel power system provided by one embodiment of the invention, the jet device, which takes waste gas as its working fluid and takes heated seawater as absorbed fluid, is arranged at the second outlet of the conformal heat exchanger; under the action of turbulent diffusion, the heat exchange form of the conformal heat exchanger is changed into forced convection heat exchange, so that the flow rate of outboard seawater is increased, thereby improving the heat exchange efficiency of the conformal heat exchanger. At the same time, the marine diesel power system provided by the embodiment of the invention heats seawater around by waste heat of the diesel engine waste gas, thereby increasing the flow rate at the seawater outlet and improving the heat exchange ability of the conformal heat exchanger. Besides, outboard seawater flows in the shell of the conformal heat exchanger, and for an underwater ship, the housing of the conformal heat exchanger does not need to be designed into a pressure-resistance structure, thereby facilitating improvement in safety reliability of the conformal heat exchanger.

As shown in FIG. 1, in one embodiment of the invention, the conformal heat exchanger 1 includes an inner shell plate 2, a heat exchange tube 3, an outer shell plate 4, an upper sealing head 5 and a lower sealing head 6. Specifically, the conformal heat exchanger 1 provided by the embodiment of the invention is conformal with the hull body, and one part of the hull is taken as the inner shell plate 2; the hull is in the shape of a circular arc, and the shapes, which are circular arcs, of the heat exchange tube 3 and the outer shell plate 4 are matched with the shape of the inner shell plate 2. The inner shell plate 2 and the outer shell plate 4 are connected and configured to form the housing, in which the heat exchange tube 3, the upper sealing head 5 and the lower sealing head 6 are arranged, of the conformal heat exchanger 1; and the upper sealing head 5 and the lower sealing head 6 are separately mounted at the two ends of the heat exchange tube 3.

Specifically, a first inlet 7 which is connected to the upper sealing head 5 and a first outlet 8 which is connected to the lower sealing head 6 are formed in the inner shell plate 2. Cooling water of the diesel engine 20 flows into the heat exchange tube 3 from the first inlet 7 through the upper sealing head 5. A second inlet 9, from which seawater enters the shell, and a second outlet 10 are formed in the outer shell plate 4. After exchanging heat with the seawater in the shell, the cooled cooling water flows into the diesel engine 20 from the lower sealing head 6 through the first outlet 8, and the heated seawater flows to the outside of the conformal heat exchanger 1 from the second outlet 10.

According to the marine diesel power system provided by one embodiment of the invention, the outboard heat exchanger is conformal with the hull structure, outboard seawater flows in the shell of the conformal heat exchanger and diesel engine cooling water flows in the shell of the conformal heat exchanger, so that an outboard space is sufficiently utilized, and the outboard heat exchanger is not arranged near a sea chest of a ship anymore, thereby realizing a flexible design of a mounting position of the heat exchanger.

Figure 3:
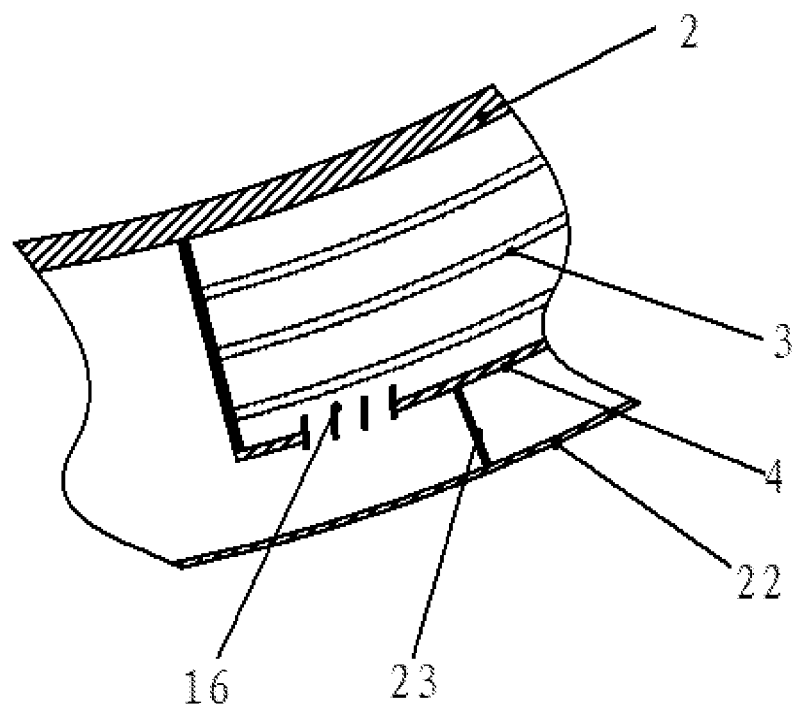
FIG. 3 is an enlarged view of A in FIG. 1.
Figure 4:
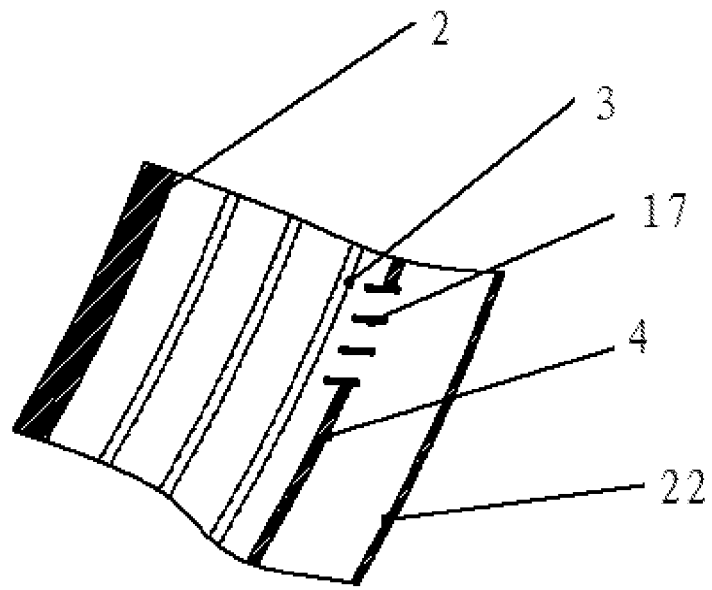
FIG. 4 is enlarged view of B in FIG. 1.

As shown in FIGS. 3 and 4, in one embodiment of the invention, the conformal heat exchanger 1 further includes an inlet grid 16 at the second inlet 9 of the conformal heat exchanger 1 and an outlet grid 17, where the inlet grid 16 and the outer shell plate 4 are arranged in an inclined mode. The inlet grid 16 can be arranged to prevent pollutants from easily blocking the conformal heat exchanger 1, thereby improving the safety reliability of the outboard cooling system. At the same time, the inlet grid 16 and the outer shell plate 4 are arranged in the inclined mode to reduce the inflow resistance of seawater. The outlet grid 17, which serves as the inlet grid 16, is arranged at the second outlet 10 of the conformal heat exchanger 1, and is arranged with the outer shell plate 4 in the inclined mode.

Further, as shown in FIG. 1, in one embodiment of the invention, the marine diesel power system further includes a water inlet baffle plate 23 which is arranged between the outer shell plate 4 of the conformal heat exchanger 1 and the hull outer shell plate 22 and is located the downstream of the second inlet 9 of the conformal heat exchanger 1 for blocking seawater and facilitating introducing the seawater into the shell of the conformal heat exchanger 1 from the second inlet 9.

As shown in FIG. 1, in one embodiment of the invention, the conformal heat exchanger 1 further includes a plurality of baffle plates 11, which are arranged in the housing of the conformal heat exchanger 1 and define included angles with the heat exchange tube 3. Specifically, the baffle plates 11 are arranged on the heat exchange tube 3, and gaps are formed between the tops or bottoms of the baffle plates 11 and the inner wall of the housing to guide seawater to flow in the shell.

Figure 2:
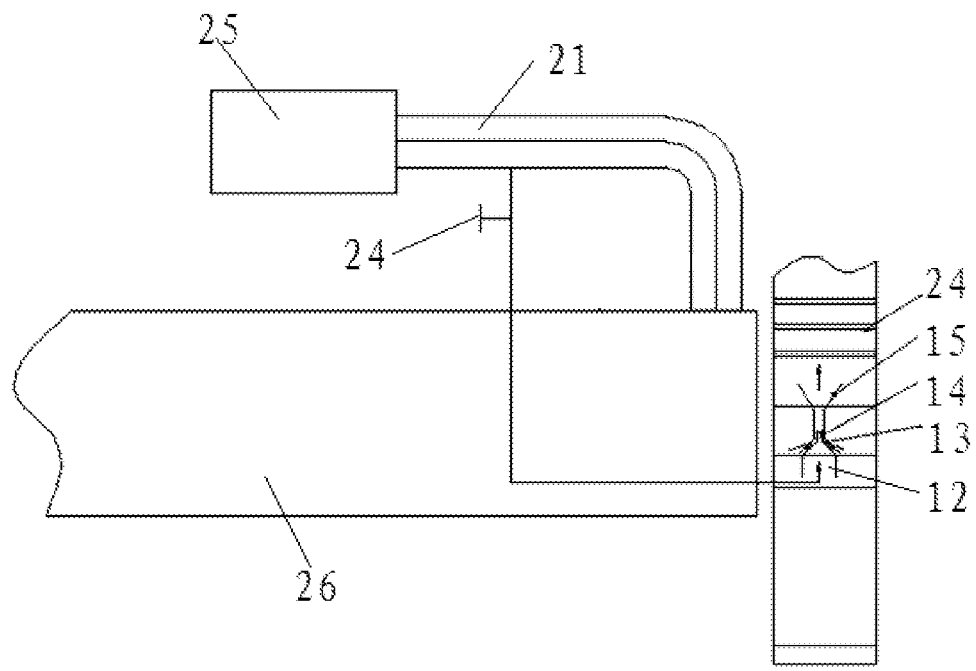
FIG. 2 is a schematic structural diagram of a jet device.

As shown in FIG. 2, in one embodiment of the invention, the jet device 12 includes a diffusing hole 15 and a spray nozzle 14 arranged in the diffusing hole 15, where a gap, configured to be a first inlet 13 of the jet device, is formed between the outer wall of the spray nozzle 14 and the inner wall of the diffusing hole 15 for sucking heated seawater flowing out from the second outlet 10 of the conformal heat exchanger 1. The spray nozzle 14 is connected to the diesel engine exhaust tube 21 for spraying out the waste gas discharged from the diesel engine exhaust tube 21. Heated seawater taken as sucked fluid and waste gas taken as a working fluid of the jet device 12 flow to the outside of the jet device 12 from the diffusing hole 15 after being mixed, under the action of turbulent diffusion, so that the forced convection heat exchange of the conformal heat exchanger 1 is realized, thereby improving the heat exchange efficiency of the conformal heat exchanger 1.

Figure 5:
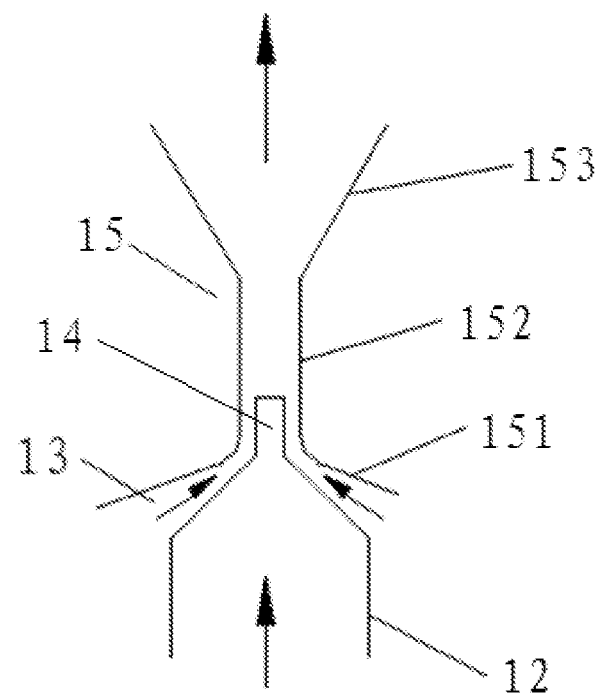
FIG. 5 is enlarged view of the jet device FIG. 2.

Further, as shown in FIG. 5, in one embodiment of the invention, the diffusing hole 15 includes a first portion 151, a second portion 152 and a third portion 153 which are sequentially connected, where a reducing structure is formed between the two opposite end surfaces of the first portion 151 for facilitating sucking heated seawater. The two opposite end surfaces of the second portion 152 are arranged at an equal distance to form a tubular structure, and a diverging structure is formed between the two opposite end surfaces of the third portion 153 for facilitating flow-out of the mixed waste gas and the heated seawater. The spray nozzle 14 is arranged in the first portion 151 and the second portion 152, and the third portion 153 is configured to be an outlet of the jet device 12.

As shown in FIG. 2, in one embodiment of the invention, the marine diesel power system further includes a seawater grid 24, specifically, the seawater grid 24 is arranged on the hull outer shell plate 22 with certain distance from the diffusing hole 15 of the jet device 12 to facilitate discharging heated seawater in the shell of the conformal heat exchanger 1 into sea.

The working principle of the marine diesel power system provided by the embodiment of the invention will be described in detail below in conjunction with FIGS. 1 and 2.

Cooling water of the diesel engine 20 flows into the shell of the conformal heat exchanger 1 from the first inlet 7 of the conformal heat exchanger 1 through the upper sealing head 5 of the conformal heat exchanger 1, and seawater flows into the shell of the conformal heat exchanger 1 from the second inlet 9 of the conformal heat exchanger 1; seawater exchanges heat with cooling water, and the cooled cooling water flows through the first outlet 8 from the lower sealing head 6 to enter the diesel engine 20 for cooling the diesel engine 20, and the heated seawater flows to the outside of the conformal heat exchanger 1 from the second outlet 10.

The jet device 12 is mounted at the second outlet 10 of the conformal heat exchanger 1, the heated seawater is sucked from the first inlet 13 of the jet device, and waste gas discharged from the diesel engine exhaust tube 21 enters the jet device 12 from the spray nozzle 14 of the jet device 12; and the waste gas taken as the working fluid of the jet device 12 and the heated seawater taken as the sucked fluid are discharged from the diffusing hole 15 of the jet device 12 after being mixed.

Finally, it should be noted that the above embodiments are only used to explain the technical solution of the invention and shall not be construed as a limitation. Although the invention is described specifically with reference to its embodiments, those ordinarily skilled in the art shall understand that any modification to the technical solution or equivalent replacement shall be covered in the scope defined in the appended claims without departing from the spirit and scope of the technical solution of the invention.

What is claimed is:

1. A marine diesel power system, comprising a diesel engine, a conformal heat exchanger and a jet device, wherein a first inlet and a first outlet of the conformal heat exchanger thereof are connected to the diesel engine and an upper and lower sealing heads thereof as well as a second inlet and a second outlet for inflowing and discharging seawater;

the jet device is arranged at the second outlet of the conformal heat exchanger, and a first inlet, a second inlet and an outlet of the jet device are separately used for sucking seawater discharged from the second outlet, connecting to a diesel engine exhaust tube and discharging seawater and waste gas discharged from the diesel engine exhaust tube.

2. The marine diesel power system according to claim 1, wherein the conformal heat exchanger comprises:
a housing,
an inner shell plate being a hull, an outer shell plate, the shape of the outer shell plate being matched with the inner shell plate, wherein the outer shell plate is connected to the inner shell plate to define the housing of the conformal heat exchanger;

a heat exchange tube comprises two sides, the shape of the heat exchange tube being matched with the inner shell plate, and arranged in the housing;

the upper sealing head and a lower sealing head, which are separately arranged in the housing and are separately positioned at the two sides of the heat exchange tube.

3. The marine diesel power system according to claim 2, wherein the first inlet and the first outlet of the conformal heat exchanger are separately formed in the inner shell plate; and the second inlet and the second outlet of the conformal heat exchanger are separately formed in the outer shell plate.

4. The marine diesel power system according to claim 3, wherein the conformal heat exchanger further comprises:

an inlet grid which is arranged at the second inlet of the conformal heat exchanger, and defines an included angle with the outer shell plate; and an outlet grid is arranged at the second outlet of the conformal heat exchanger and defines an included angle between the outer shell plate.

5. The marine diesel power system according to claim 2, wherein the conformal heat exchanger further comprises a plurality of baffle plates, which are arranged in the housing and define included angles with the heat exchange tube.

6. The marine diesel power system according to claim 1, wherein the jet device comprises a diffusing hole and a spray nozzle arranged in the diffusing hole, a gap, configured to be the first inlet of the jet device, is formed between the outer wall of the spray nozzle and the inner wall of the diffusing hole.

7. The marine diesel power system according to claim 6, wherein the spray nozzle is connected to the diesel engine exhaust tube and is configured to be the second inlet of the jet device.

8. The marine diesel power system according to claim 6, wherein the diffusing hole comprises a first portion, a second portion and a third portion which are sequentially connected, a reducing structure is formed between an opposite end surfaces of the first portion, an opposite end surfaces of the second portion are arranged at an equal distance, and a diverging structure is formed between an opposite end surfaces of the third portion.

9. The marine diesel power system according to claim 8, wherein the spray nozzle is arranged in the first portion and the second portion of the diffusing hole, and the third portion of the diffusing hole is configured to be an outlet of the jet device.

10. The marine diesel power system according to claim 6, further comprising:

a seawater grid which is arranged at a hull outer shell plate and is located at the downstream of the diffusing hole; and a water inlet baffle plate which is arranged between the outer shell plate and the hull outer shell plate, and is located at the downstream of the second inlet of the conformal heat exchanger.

* * * * *